United States Patent
Shoji et al.

(10) Patent No.: US 9,353,719 B2
(45) Date of Patent: May 31, 2016

(54) POWER SUPPLY DEVICE, ON-VEHICLE ELECTRONIC SYSTEM, AND METHOD FOR CONTROLLING BOOSTING CIRCUIT

(71) Applicant: Alpine Electronics, Inc., Tokyo (JP)

(72) Inventors: Takahiko Shoji, Iwaki (JP); Masao Hayashi, Iwaki (JP); Takafumi Kurimoto, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 383 days.

(21) Appl. No.: 14/161,036

(22) Filed: Jan. 22, 2014

(65) Prior Publication Data

US 2014/0278022 A1 Sep. 18, 2014

(30) Foreign Application Priority Data

Mar. 12, 2013 (JP) ................................. 2013-049517

(51) Int. Cl.
*F02N 11/08* (2006.01)
*B60R 16/03* (2006.01)

(52) U.S. Cl.
CPC ............ *F02N 11/0862* (2013.01); *B60R 16/03* (2013.01); *F02N 11/0814* (2013.01); *F02N 11/0848* (2013.01); *F02N 2011/0888* (2013.01); *F02N 2250/02* (2013.01)

(58) Field of Classification Search
CPC ............ F02N 11/0814; F02N 11/0866; F02N 11/0888; F02N 11/0862; F02N 2011/0888; B60R 16/03
See application file for complete search history.

(56) References Cited

U.S. PATENT DOCUMENTS

| | | | | |
|---|---|---|---|---|
| 4,896,637 | A | 1/1990 | Yamamoto | |
| 5,583,751 | A * | 12/1996 | Nakazawa | B60K 17/043 363/20 |
| 7,216,617 | B2 * | 5/2007 | Tanaka | F02D 41/266 123/179.3 |
| 8,350,535 | B2 * | 1/2013 | Maleus | H02J 7/0068 320/133 |
| 8,928,172 | B2 * | 1/2015 | Goto | F02D 17/04 307/9.1 |
| 2009/0243574 | A1 * | 10/2009 | Mayuzumi | F02D 41/20 323/282 |
| 2010/0090526 | A1 * | 4/2010 | Itou | F02N 11/0814 307/10.6 |
| 2012/0316749 | A1 * | 12/2012 | Ubukata | B60R 16/03 701/102 |
| 2013/0289854 | A1 * | 10/2013 | Takahashi | B60L 11/1809 701/112 |

FOREIGN PATENT DOCUMENTS

| | | |
|---|---|---|
| JP | 10-176641 | 6/1998 |
| JP | 2002-038984 | 2/2002 |

* cited by examiner

*Primary Examiner* — Hieu T Vo
*Assistant Examiner* — Sherman Manley
(74) *Attorney, Agent, or Firm* — Brinks Gilson & Lione

(57) ABSTRACT

A power supply device is mounted in a vehicle capable of starting an engine with power supplied from a battery, and includes a booster configured to boost voltage supplied from the battery, a detecting unit configured to detect an engine start, a counting unit configured to count an engine start count based on the detecting unit, and a control unit configured to control the booster. The control unit outputs a control signal to permit the booster to boost the voltage in response to the engine start when the engine start count counted by the counting unit within a timer period does not exceed an allowable number of times.

16 Claims, 12 Drawing Sheets

POWER SUPPLY DEVICE, ON-VEHICLE ELECTRONIC SYSTEM, AND METHOD FOR CONTROLLING BOOSTING CIRCUIT

RELATED APPLICATION

The present application claims priority to Japanese Patent Application Number 2013-049517, filed Mar. 12, 2013, the entirety of which is hereby incorporated by reference.

BACKGROUND

1. Field of the Invention

The present invention relates to a power supply device mounted in a vehicle capable of starting an engine with power supplied from a battery, and particularly relates to controlling a boosting circuit included in the power supply device.

2. Description of the Related Art

A vehicle is, as is well-known, provided with an engine starting device to start the engine. The engine starting device executes cranking with power supplied from the battery in response to an ignition key operation by a driver. Generally, an alternator is connected to the battery, and the alternator supplies, to a load, current generated by driving the engine, and also charges excess current to the battery.

Electronic devices mounted in the vehicle, such as a video/audio device, a television/radio reception device, a navigation device, and an air conditioner, are configured to be supplied with voltage from the battery. Before being supplied, the voltage is boosted so to be prepared for a battery voltage drop at the time of engine start. More specifically, a large amount of power is consumed by cranking for starting the engine, thereby causing a drop of the voltage supplied from the battery. Consequently, the electronic devices are reset, and normal operation may not be guaranteed. To avoid such a situation, the electronic device or the power supply device connected to the electronic device is provided with a boosting circuit which boosts the voltage supplied from the battery in response to the drop of the voltage from the battery below a threshold, or in response to a start of the engine starting device.

In the power supply device provided with the boosting circuit, the boosting circuit is configured to boost the voltage from the battery whenever the voltage from the battery drops below the threshold from the beginning. With this configuration, however, the boosting circuit requires a large rated value, making it difficult to reduce the size of the power supply device. Therefore, Japanese Patent Application Laid-Open No. 10-176641 discloses a power supply device in which a boosting circuit is inhibited from boosting voltage except during an engine starting period. FIG. 1 is a diagram illustrating a configuration of an on-vehicle electronic control unit disclosed in Japanese Patent Application Laid-Open No. 10-176641. An on-vehicle electronic control unit 2 (hereinafter referred to as ECU 2) is actuated by receiving power supplied from a battery BT, and controls the engine operating condition by driving, for example, an injector 18 based on detection signals from various sensors 10, 12, 14, and 16. The power from the battery BT is supplied to a power circuit 30 of the ECU 2 and to an engine starting device 4 while a key switch KS is turned ON. Also, the engine starting device 4 executes cranking to start the engine only while the power is being supplied via a relay 6 in which a contact closes when a starter switch SS is turned ON. The ECU 2 is configured to receive, as a starter signal, a terminal voltage of a coil that actuates the contact of the relay 6. The starter signal is at a high level only while the engine starting device 4 executes the cranking. In the case where voltage boosting conditions are satisfied, a booster 30a boosts the voltage supplied from the battery, and a constant voltage unit 30b converts the boosted voltage to a constant voltage Vcc and outputs the boosted voltage.

FIG. 2 is a time chart illustrating the operation of the booster 30a. As illustrated in FIG. 2, when the engine starting device 4 starts operating in response to the operation of the starter switch SS, a battery voltage+B drops to a value smaller than a reference voltage V1. At the same time, the starter signal reaches the high level, thereby satisfying the voltage boosting conditions. Consequently, the voltage boost is started by a booster IC 32. After that, the starter switch SS is opened, and when the starter signal reaches a low level, the voltage boosting conditions become unsatisfied. Consequently, the voltage boost finishes although the battery voltage+B has not reached the reference voltage V1 as illustrated by CASE 1 in FIG. 2. On the other hand, in the case where the battery voltage+B recovers to the reference voltage V1 by, for example, starting the engine while the starter switch SS is being operated, the voltage boosting conditions become unsatisfied at that point, and then the voltage boost finishes as illustrated by CASE 2 in FIG. 2.

Additionally, in an idle stop vehicle configured to temporarily and automatically stop the engine when the vehicle stops for signal waiting and the like, the more frequently the engine starts, the larger the battery consumption becomes. Also, continuously running an air conditioner fan while the engine is stopped is one of the factors that accelerate the battery consumption. When the ECU is reset due to the battery voltage drop at the time of the engine start, various kinds of electric load troubles may occur. Therefore, in the idle stop vehicle disclosed in Japanese Patent No. 3826992, success probability of the engine start is increased in the following manner. That is, a voltage compensating unit is inhibited from compensating the battery voltage in order to prioritize the engine start in the event that the battery is exceedingly consumed due to the following circumstances: a predetermined time has passed after the engine is stopped, or the engine start has failed (e.g., the engine start is not completed although the engine starter has tried to start the engine a prescribed number of times). As a result, current supplied from the battery is effectively used for starting the engine.

SUMMARY

As described above, the voltage supplied from the battery largely drops due to power consumption at the time of the engine start. Therefore, a boosting circuit that boosts the voltage supplied from a battery in response to a start of an engine starting device is necessary for an on-vehicle electronic device. However, since relatively large current flows in the boosting circuit, there is a possibility that a coil of the boosting circuit generates heat in the case where the engine is repeatedly started/stopped by multiple ignition operations. In the worst case, there is a possibility that the coil may be burnt and the power supply device malfunctions. Meanwhile, the coil may be prevented from being burnt by using a heat-resistant coil having a large rating. However, in such a case, there is a problem in that the boosting circuit or the power supply device including the boosting circuit is increased in size and weight.

An object of embodiments of the present invention is to provide a power supply device, an on-vehicle electronic system, a program for controlling a boosting circuit, and a method for controlling the boosting circuit, capable of solving the above-mentioned problems in the related art and of being reduced in size and weight.

A power supply device according to an embodiment of the present invention is mounted in a vehicle configured to start an engine with power supplied from a battery, and includes: a boosting circuit configured to boost voltage supplied from the battery; a detecting unit configured to detect a start of the engine; a counting unit configured to count an engine start count based on the detecting unit; and a control unit configured to control the boosting circuit. The control unit permits the boosting circuit to boost the voltage in response to the engine start detected by the detecting unit when the engine start count counted by the counting unit for a predetermined period does not exceed a first allowable number of times.

Preferably, the control unit inhibits the boosting circuit from boosting the voltage for a predetermined time when the engine start count counted by the counting unit for the predetermined period exceeds a second allowable number of times that is larger than the first allowable number of times. Preferably, the power supply device further includes a time measuring unit configured to measure a time in response to the engine start, and the predetermined period is determined by the time measuring unit. Preferably, the power supply device further includes a temperature detecting unit configured to detect a temperature of the boosting circuit, and the control unit determines at least one of the predetermined period, the first allowable number of times, and the second allowable number of times based on the detected temperature of the boosting circuit.

Further, an on-vehicle electronic system according to an embodiment of the present invention includes a power supply device having the above-described configuration, and at least one electronic device configured to be actuated by power supplied from the power supply device. Preferably, the power supply device is built inside the at least one electronic device.

A program for controlling a boosting circuit according to an embodiment of the present invention is executed by a power supply device mounted in a vehicle configured to start an engine with power supplied from a battery. The program includes instructions to execute: detecting a start of the engine; counting an engine start count that is detected; and permitting the boosting circuit to boost voltage in response to detection of the engine start when the engine start count counted for a predetermined period does not exceed a first allowable number of times. Preferably, the program further includes an instruction to execute inhibiting the boosting circuit from boosting the voltage for a predetermined time when the engine start count counted for the predetermined period exceeds a second allowable number of times that is larger than the first allowable number of times.

A method for controlling a boosting circuit according to an embodiment of the present invention is executed by the power supply device mounted in a vehicle capable of starting an engine by power supplied from a battery. The method includes: detecting a start of the engine; counting the detected engine start count; and permitting the boosting circuit to boost a voltage in response to detection of the engine start when the engine start count counted for a predetermined period does not exceed a first allowable number of times.

According to an embodiment of the present invention, it is possible to prevent the coil and the like used in the boosting circuit from being burnt, and avoid malfunctions of the power supply device while boosting the voltage to a maximum level within an operation guarantee range of the boosting circuit. Moreover, it is possible to provide a power supply device that can be reduced in size and weight.

DETAILED DESCRIPTION OF THE PREFERRED EMBODIMENTS

A power supply device according to an embodiment of the present invention is mounted in a vehicle capable of starting an engine with power supplied from a battery. According to a preferred embodiment, the power supply device may supply the power to one or a plurality of electronic devices mounted in the vehicle. The above-described power supply device may be built inside each of the electronic devices. Alternatively, the power supply device may be used by one electronic device, or shared among the plurality of electronic devices. Power supply devices according to preferred embodiments of the present invention will be described below with reference to the attached drawings.

Figure 1:
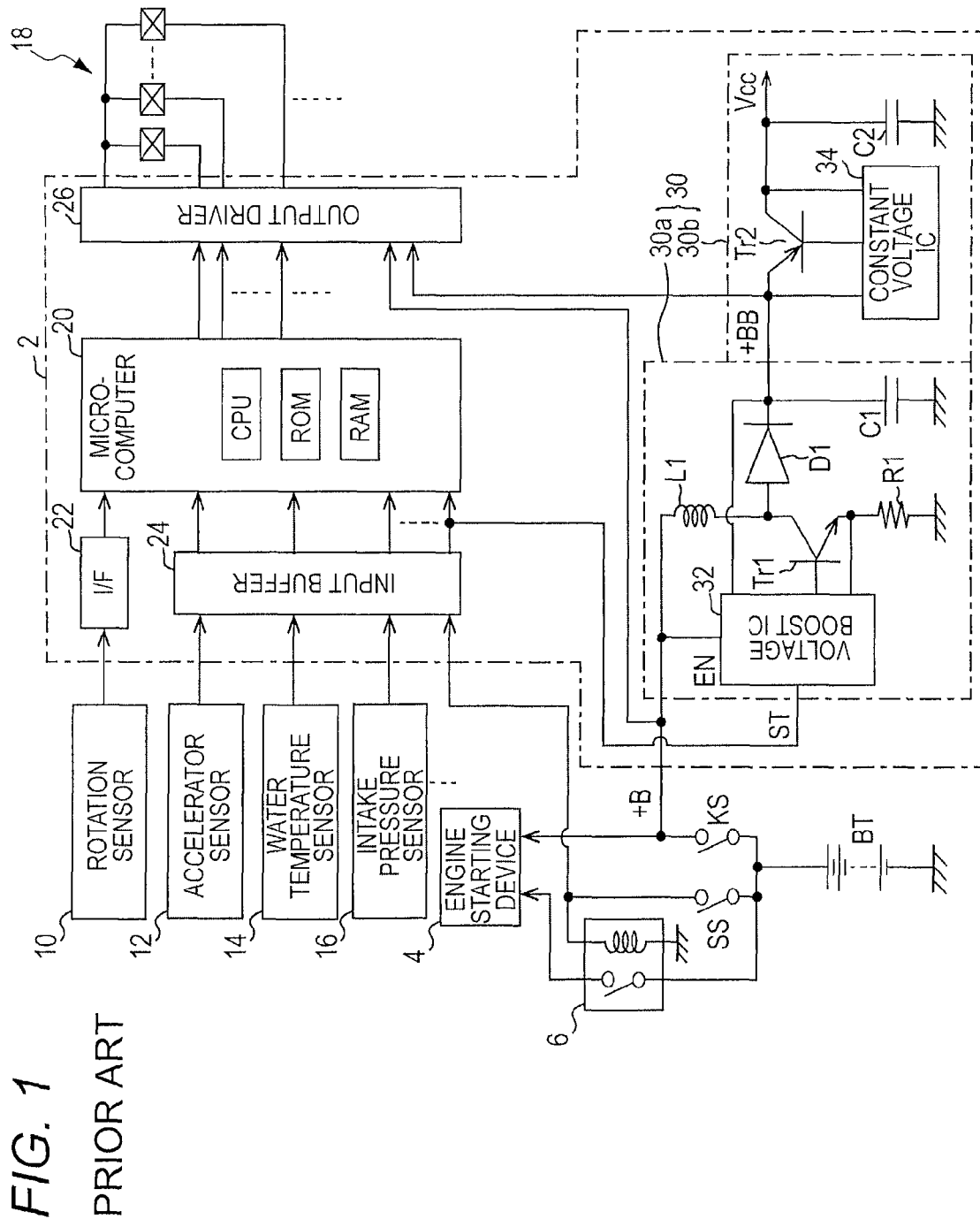
FIG. 1 is a diagram illustrating a configuration of an on-vehicle electronic control unit in the related art.
Figure 2:
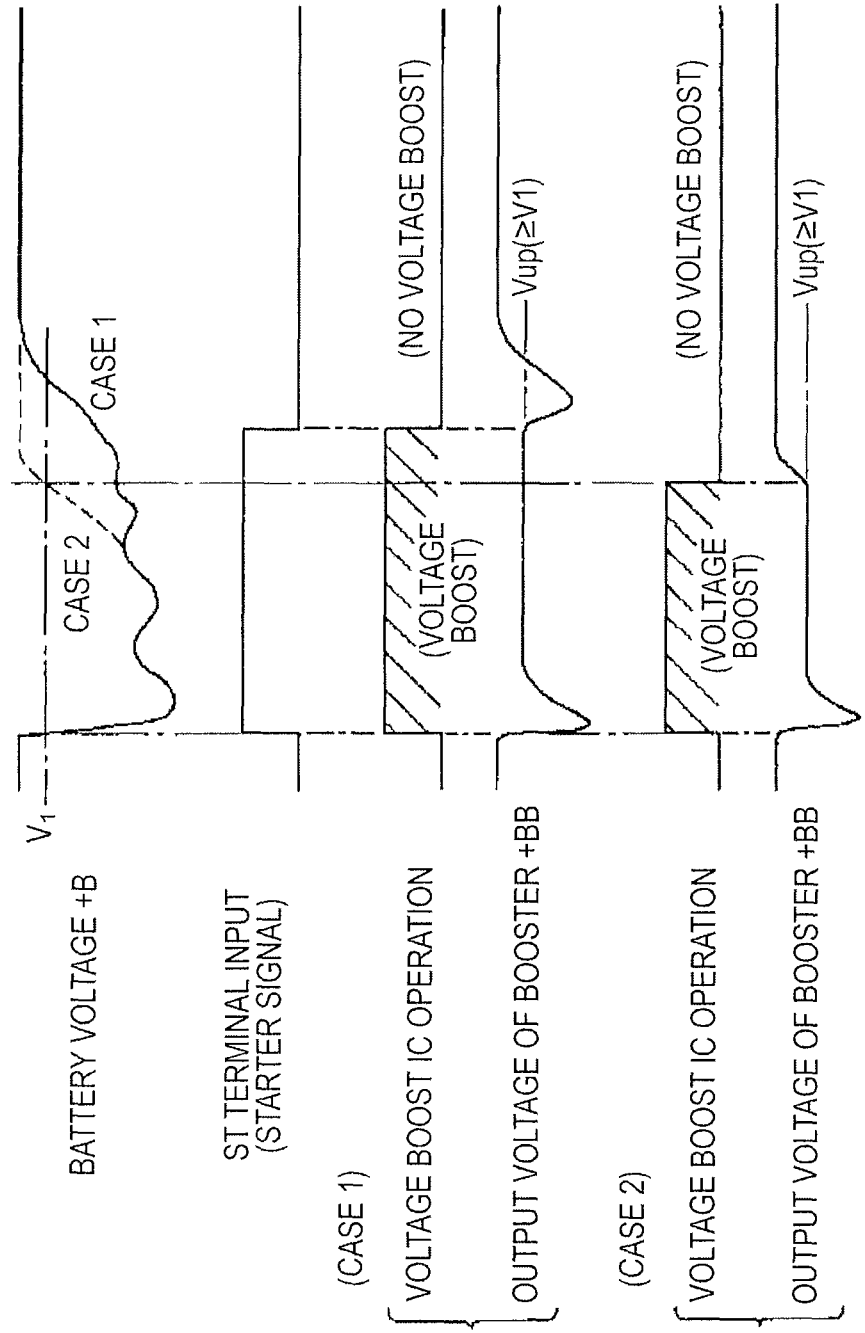
FIG. 2 is a timing chart illustrating operation of a booster illustrated in FIG. 1.
Figure 3:
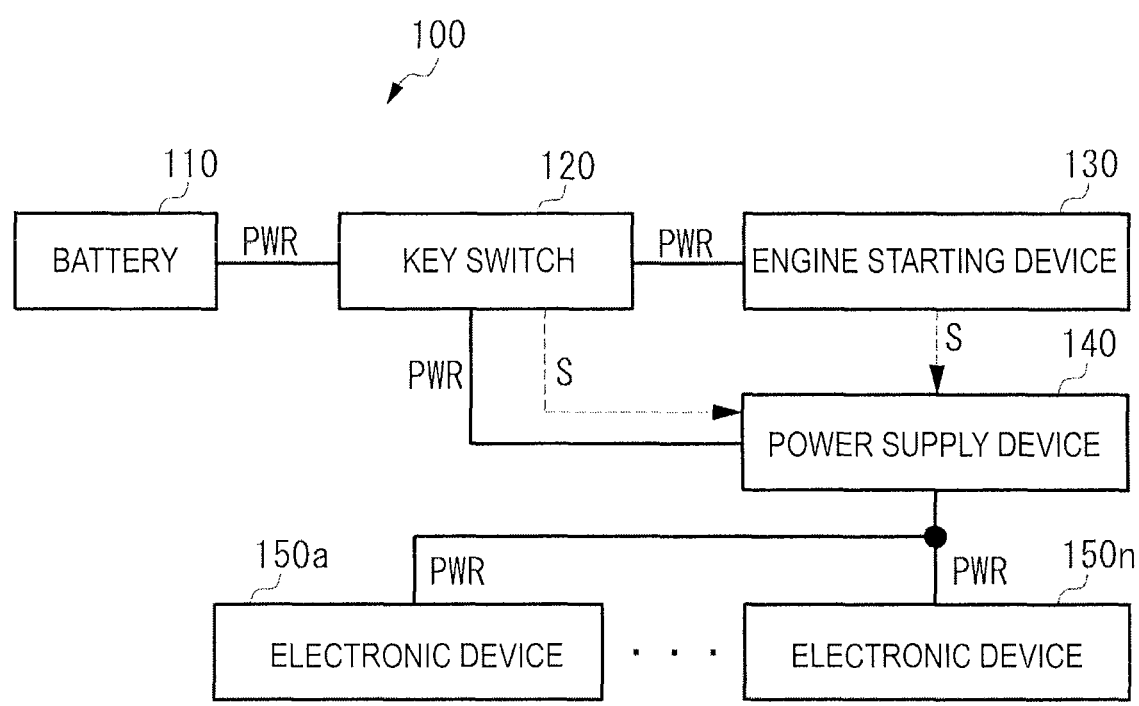
FIG. 3 is a block diagram illustrating a configuration of an on-vehicle electronic system according to an embodiment of the present invention.

FIG. 3 is a block diagram illustrating a configuration of an on-vehicle electronic system according to an embodiment of the present invention. The on-vehicle electronic system 100 includes a battery 110, a key switch 120, an engine starting device 130, a power supply device 140, and one or a plurality of electronic devices 150a to 150n. The battery 110 is mounted in the vehicle and supplies power PWR. A driver turns ON/OFF an accessory switch (ACC) and an ignition switch (IG) by the key switch 120. The engine starting device 130 starts the engine in response to the ignition switch being turned ON. The power supply device 140 supplies the electronic device with the power PWR supplied from the battery 110. The electronic devices 150a to 150n are actuated by the power PWR supplied from the power supply device 140. In FIG. 3, solid lines indicate the power PWR supplied from the battery 110, and dashed lines indicate an engine start signal S.

As is known, the key switch 120 supplies the power PWR from the battery 110 to the power supply device 140 when the driver turns ON the accessory switch. At this point, the power PWR from the battery 110 is not supplied to the engine starting device 130. When the driver turns ON the ignition switch, the key switch 120 supplies the power PWR from the battery 110 to the engine starting device 130, and the engine starting device 130 starts the engine by cranking.

As described later, the power supply device 140 stably supplies the power PWR to the electronic device 150 while preventing a coil of the boosting circuit from being burnt by boosting the voltage supplied from the battery 110 based on an engine start signal S from the key switch 120 or the engine starting device 130, or by inhibiting the voltage boosting.

Figure 4A:
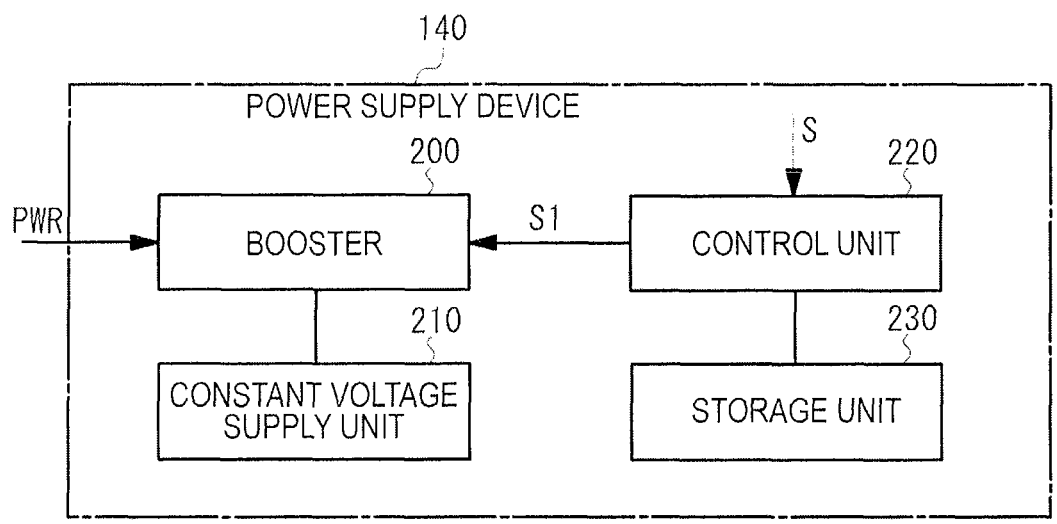
FIG. 4A is a block diagram illustrating an internal configuration of a power supply device.
Figure 4B:
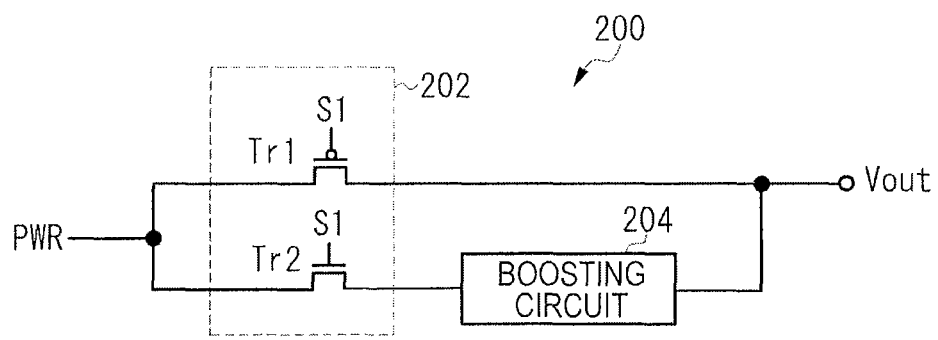
FIG. 4B is a diagram illustrating an internal configuration of the booster.

FIGS. 4A and 4B are block diagrams illustrating an internal configuration of the power supply device 140. The power supply device 140 according to the present embodiment includes a booster 200, a constant voltage supply unit 210, a control unit 220, and a storage unit 230. When the control unit 220 determines that voltage boosting conditions are satisfied, the booster 200 boosts the voltage supplied from the battery 110, and outputs the boosted voltage to the constant voltage supply unit 210. On the other hand, when the control unit 220 determines that the voltage boosting conditions are not satisfied, the voltage supplied from the battery 110 is output as it is to the constant voltage supply unit 210 without being boosted. The control unit 220 notifies the booster 200, through a control signal S1, of a determination result as to whether the voltage boosting conditions are satisfied.

FIG. 4B is a diagram of an exemplary configuration of the booster 200. The booster 200 includes a connection switching unit 202 which receives the power PWR from the battery, a boosting circuit 204 connected to one of the switches of the connection switching unit 202, and an output voltage (Vout) output unit. In the case where the voltage boosting conditions are satisfied based on the control signal S1 from the control unit 220, the connection switching unit 202 supplies the power PWR from the battery 110 to the boosting circuit 204. In the case where the voltage boosting conditions are not satisfied, the connection switching unit 202 supplies the power PWR from the battery 110 to the Vout output unit. The connection switching unit 202 is configured in accordance with a known technology, and includes a p-channel MOS transistor Tr1 (PMOS transistor) and an n-channel MOS transistor Tr2 (NMOS transistor) connected in parallel, and gates of both of the transistors are commonly connected to the control signals S1, as illustrated in FIG. 4B, for example. When the voltage boosting conditions are satisfied, the control signal S1 has a logic H (high) level, the NMOS transistor Tr2 is turned ON, and the PMOS transistor Tr1 is turned OFF. When the voltage boosting conditions are not satisfied, the control signal S1 has a logic L (low) level, the NMOS transistor Tr2 is turned OFF, and the PMOS transistor Tr1 is turned ON.

Figure 5:
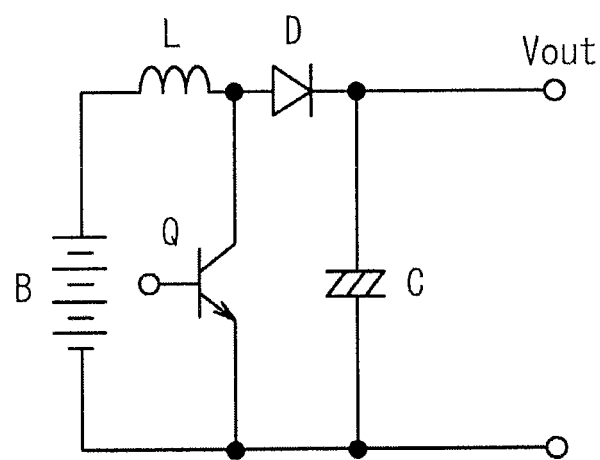
FIG. 5 is a circuit diagram illustrating a known booster chopper circuit.

The boosting circuit 204 may be formed of a known circuit, for example, a typical booster chopper circuit as illustrated in FIG. 5. As illustrated in FIG. 5, a coil (inductor) L and a diode D are connected to a battery B in series, and a transistor Q and a capacitor C are each connected to the battery B in parallel. The transistor Q is turned ON or OFF in response to a PWM signal from a PWM circuit not illustrated. When the transistor Q is turned ON, energy is accumulated in the coil L. When the transistor Q is turned OFF, the energy is emitted from the coil L, and a boosted voltage Vout is output. The boosted voltage Vout is obtained by superimposing additional voltage onto a voltage Vb of the battery B. The above-described boosting circuit may be formed of one chip, and the coil may be externally connected or housed inside the chip.

The constant voltage supply unit 210 receives the Vout output from the booster 200, and generates a constant voltage using a constant voltage circuit such as a known switching regulator, and subsequently supplies the voltage to each electronic device.

The control unit 220 controls the operation of the power supply device 140, particularly the voltage boost executed by the booster 200, in response to the engine start signal S from the key switch 120 or the engine starting device 130. The control unit 220 includes, for example, a microcomputer and a microprocessor. The storage unit 230 is capable of for example, storing a program or software to be executed by the control unit 220, and other data.

Figure 6:
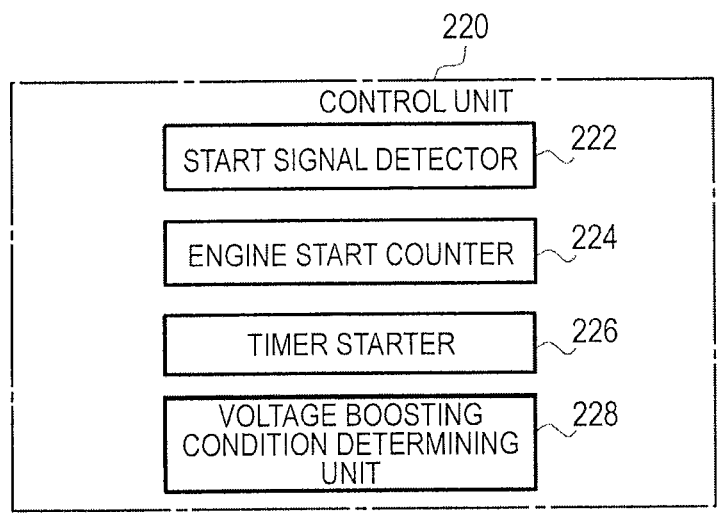
FIG. 6 is a block diagram illustrating functional components of a control unit in the power supply device according to an embodiment of the present invention.

FIG. 6 is a block diagram illustrating functional components included in the control unit 220. The control unit 220 includes a start signal detector 222, an engine start counter 224, a timer starter 226, and a voltage boosting condition determining unit 228. The start signal detector 222 detects the engine start signal S. The engine start counter 224 counts the number of times the engine is started (hereinafter referred to as "engine start count"). The timer starter 226 measures a time in response to an initial engine start when the timer is not started. The voltage boosting condition determining unit 228 determines whether the voltage boosting conditions of the booster 200 are satisfied and outputs, to the booster 200, a control signal S1 indicating a determination result.

Figure 7:
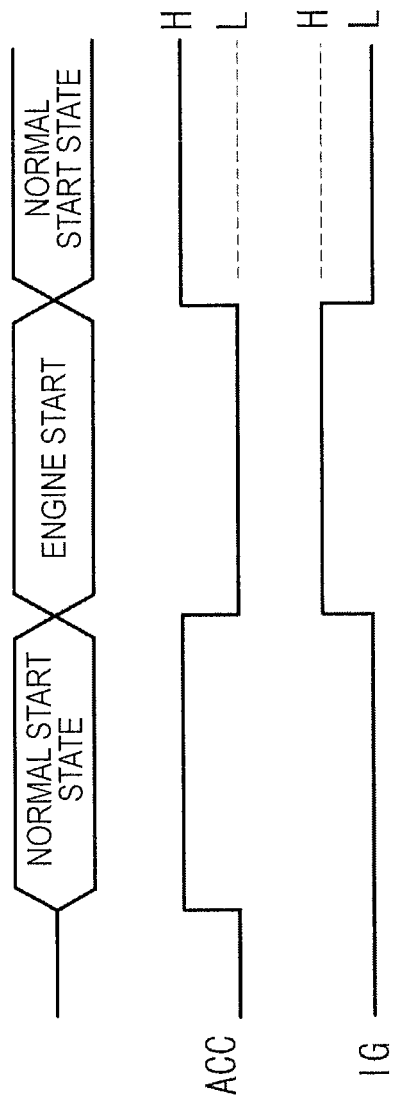
FIG. 7 is a diagram illustrating logic states of a start signal.

Preferably, the start signal detector 222 detects the engine start signal S from the key switch 120 illustrated in FIG. 3. The engine start signal S preferably indicates at least that the ignition switch is turned ON. The engine start signal S according to the present embodiment includes a logic signal indicating a state of the accessory key (ACC), and a logic signal indicating a state of the ignition key (IG) as illustrated in FIG. 7. When the accessory key is turned ON, the power PWR from the battery 110 is supplied to each unit, establishing a normal start state. At this point, the engine start signal S having the logic H level for the accessory key and the logic L level for the ignition key, is output. When the ignition key is turned ON, the engine start signal S is output. The engine start signal has the logic L level for the accessory key reversed from H level and the logic H level for the ignition key changed from L level. Incidentally, it is also preferable to configure this engine start signal S to be output to the control unit 220 from the engine starting device 130.

The engine start counter 224 counts the number of times the engine start signal S is detected by the start signal detector 222. Preferably, the engine start counter 224 includes a counter that is reset when the accessory key is initially turned ON.

The timer starter 226 measures a time for a preset timer period in response to detection of the engine start signal S when the timer is not started. More specifically, in the case where the timer is not started, commencement of the timer period is when the engine start signal S is detected. In the case where the timer is already started, the timer starter 226 does not start the timer even when the engine start signal S is detected. This timer period may be suitably set as necessary.

The voltage boosting condition determining unit 228 determines whether the voltage boosting conditions of the boosting circuit 204 are satisfied. More specifically, in the case where an engine start time is within the timer period T set by the timer starter 226, and an engine start count counted by the engine start counter 224 is equal to or less than an allowable number of times N, the voltage boosting condition determining unit 228 determines that the voltage boosting conditions are satisfied and then permits the boosting circuit to boost the voltage. The timer period T and the allowable number of times N are selected in accordance with, for example, a rating of the coil used in the boosting circuit 204, but preferably, the timer period T and the allowable number of times N are set such that the temperature of heat generated in the coil due to the voltage boost executed by the boosting circuit 204 remains below a predetermined temperature. On the other hand, in the case where the engine start time exceeds the timer period T, or in the case where the engine start count exceeds the allowable number of times N, the voltage boosting condition determining unit 228 determines that the voltage boosting conditions are not satisfied and the boosting circuit 204 is inhibited from boosting the voltage. The voltage boosting condition determining unit 228 outputs, to the booster 200, the control signal S1 indicating whether the voltage boosting conditions are satisfied.

Figure 8:
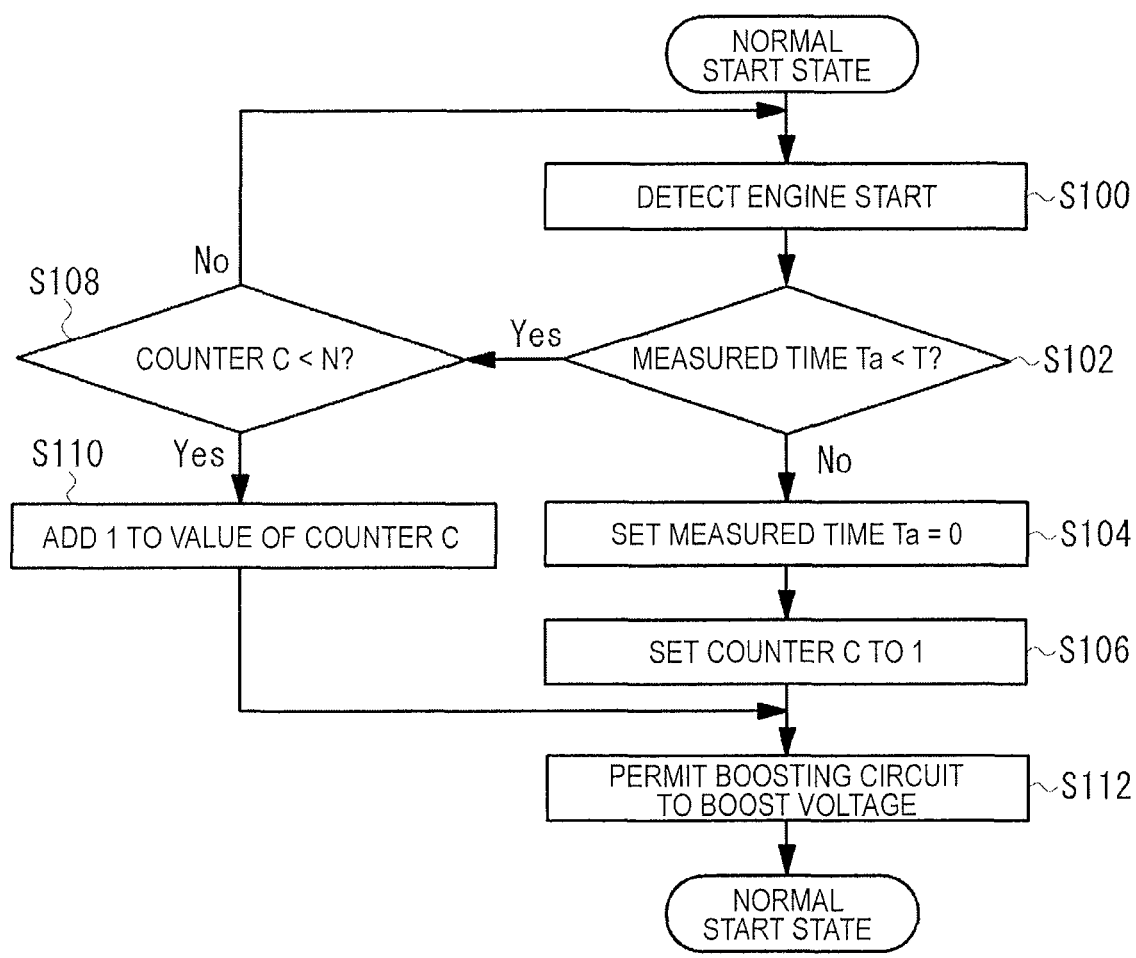
FIG. 8 is a flowchart illustrating operation of the power supply device according to a first embodiment of the present invention.

Next, the operation of the power supply device according to the present embodiment will be described with reference to a flowchart illustrated in FIG. 8. The power supply device 140 and the electronic device 150 receive the power from the battery in response to the accessory key being turned ON by the driver, and then become the normal start state.

When the ignition key is turned ON under the normal start state, cranking is executed by the engine starting device 130. In response to this engine start, the engine start signal S is output to the power supply device 140 from the key switch 120 or the engine starting device 130, and then an engine start is detected by the start signal detector 222 (S100).

Next, when the engine start is detected, the timer starter 226 determines whether the timer is operating (S102). More specifically, the timer starter 226 compares the timer period T with a measured time Ta at the time of detecting the engine start. In the case where the measured time Ta exceeds the timer period T, the timer starter 226 determines that the timer is not operating, and in the case where the measured time Ta does not exceed the timer period T, the timer starter 226 determines that the timer is operating.

In the case where it is determined that the timer is not operating, the timer starter 226 sets the measured time Ta to zero (S104), and starts measuring a time within the timer period T. Further, the engine start counter 224 sets a counter C to "1" since the engine start currently detected corresponds to an initial engine start within the timer period which has been newly started (S106).

In the case where it is determined in step S102 that the timer is operating, the voltage boosting condition determining unit 228 determines whether a value of the counter C in the engine start counter 224 is smaller than the allowable number of times N (S108). In the case where the count value is equal to or more than the allowable number of times N, the procedure returns to step S100, thereby not permitting the boosting circuit to boost the voltage. In other words, the control signal S1 output from the control unit 220 comes to have the logic L level, and the transistor Tr1 is turned ON and the transistor Tr2 is turned OFF at the connection switching unit 202. Consequently, the power PWR supplied from the battery 110 is supplied to the constant voltage supply unit 210 via the Vout output unit without boosting the voltage.

On the other hand, in the case where the engine start count is less than the allowable number of times N, the engine start counter 224 adds 1 to a count value of the counter C (S110). Further, since the measured time Ta at the time of detecting the engine start is within the timer period T and the engine start count is less than the allowable number of times N, the voltage boosting condition determining unit 228 outputs, to the booster 200, the control signal S1 that permits the boosting circuit 204 to boost the voltage, i.e., the control signal S1 indicating the logic H level (S112). This causes the transistor Tr1 to be turned OFF and the transistor Tr2 to be turned ON at the connection switching unit 202, and the power PWR from the battery 110 is supplied to the boosting circuit 204 in which the voltage supplied from the battery is boosted. The boosted voltage is supplied to the constant voltage supply unit 210 via the Vout output unit.

Figure 9:
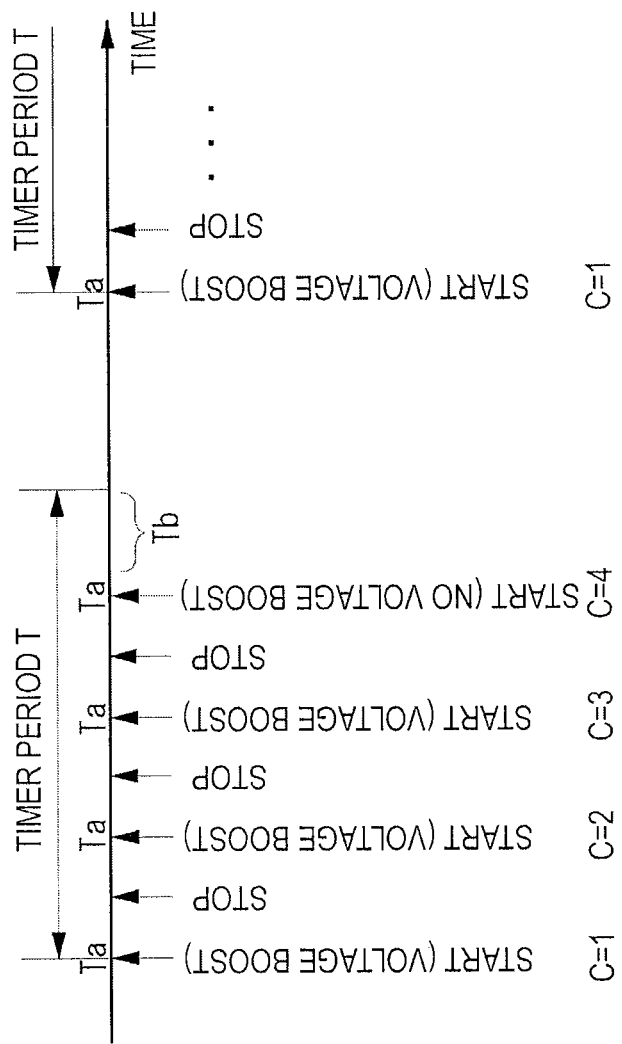
FIG. 9 is a diagram illustrating an exemplary operation according to the first embodiment.

FIG. 9 is a diagram schematically illustrating permission/inhibition of the voltage boost executed by the boosting circuit when the timer period T is set to 1 minute and the allowable number of times N is set to 4. As illustrated in FIG. 9, the boosting circuit 204 is permitted to boost the voltage as long as the engine start count of the counter C is three times or less within the timer period T. When the engine start count within the timer period T reaches the allowable number of times N or more, the boosting circuit 204 is inhibited from boosting the voltage. Even though the engine is started within a remaining time Tb of the timer period T, the boosting circuit 204 is inhibited from boosting the voltage. Also, in the case where the engine is started again after the timer period T has passed, a measured time Ta at the time of detecting the engine start is reset to zero, and the counter C is set to 1. Then, the procedure illustrated in FIG. 8 is repeated again.

Next, a second embodiment of the present invention will be described. According to the first embodiment, an allowable number of times N is used for determining whether to permit or inhibit the voltage boost. However, this allowable number of times N is based on a presumption that a coil of a boosting circuit reaches a constant temperature. Therefore, there is a constant time margin before an engine start count reaches the number of times Nf at which the coil is completely and physically burnt or malfunctions. Assume that a marginal allowable number of times Ng is larger than the allowable number of times N and slightly smaller than the number of times Nf at which the coil is physically and completely burnt or malfunctions (i.e., N<Ng<Nf). In the case where the boosting circuit is permitted to boost the voltage until the engine start count reaches the marginal allowable number of times Ng, the boosting circuit is permitted to boost the voltage also at the time of starting the engine within a remaining period Tb illustrated in FIG. 8. As a result, success probability of the engine start is increased. Therefore, according to the second embodiment, the voltage boost is permitted until the engine start count reaches the marginal allowable number of times Ng within the timer period T. Meanwhile, in the case where the engine start count, i.e., the number of times voltage is boosted, reaches the marginal allowable number of times Ng, a coil cooling period Tc for cooling the coil for a predetermined period is set to protect the boosting circuit 204.

Figure 10:
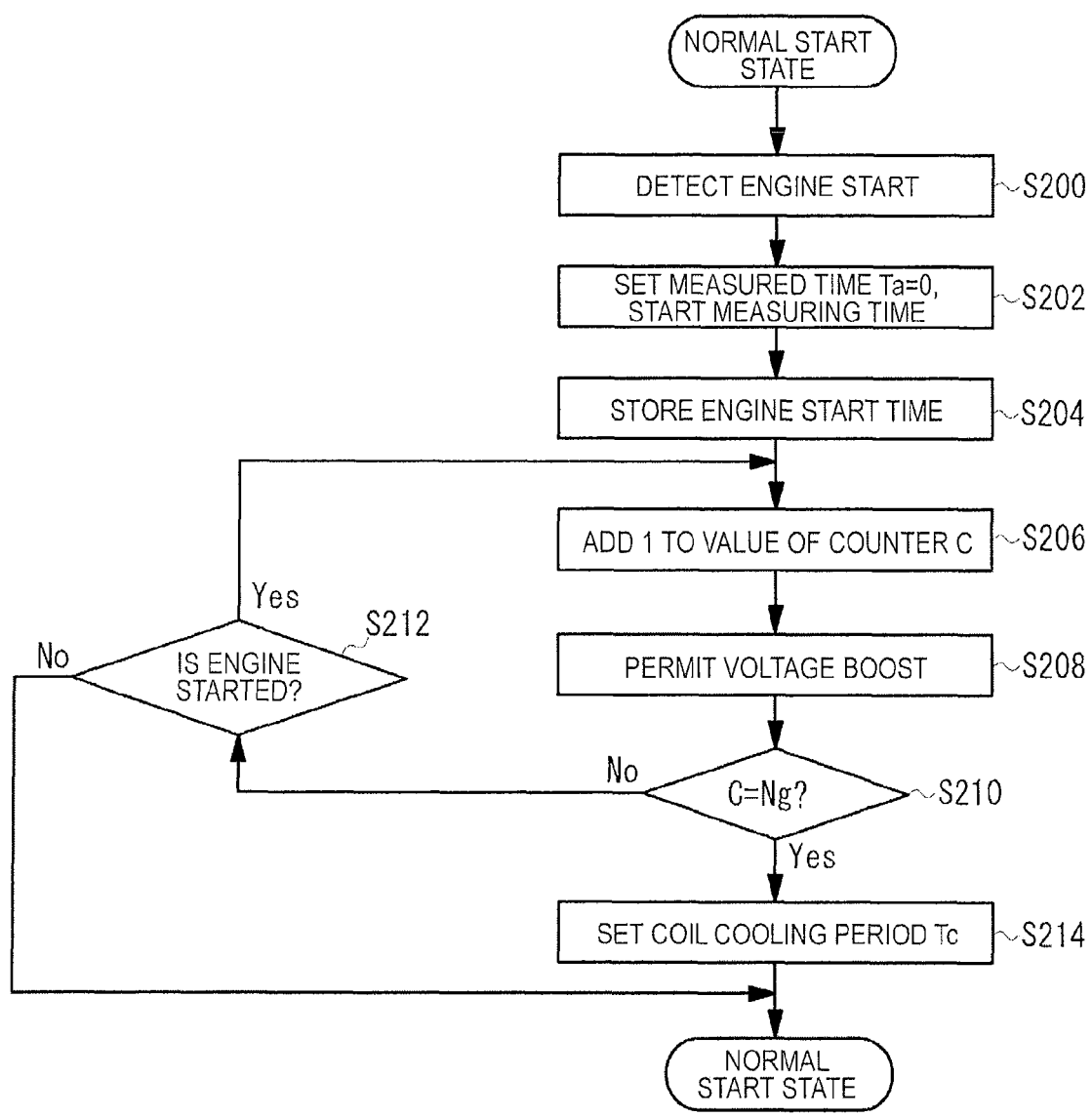
FIG. 10 is a flowchart illustrating operation of the power supply device according to a second embodiment of the present invention.

Next, operation of a power supply device according to the second embodiment will be described with reference to a flowchart illustrated in FIG. 10. Here, the description will be given for the case where a timer is not operating, and an engine is initially started. A start signal detector 222 detects a start of the engine based on an engine start signal S (S200). In response to this detection, a timer starter 226 resets a measured time Ta to zero, and starts measuring the time of a timer period T (S202). Also, a voltage boosting condition determining unit 228 stores the time when the engine is started in response to the timer starting (S204). The time when the engine is started is stored when the timer is started. In the case where the timer has already started, the time when the engine is started is not stored. Further, an engine start counter 224 adds 1 to a value of a counter C (S206).

Next, the voltage boosting condition determining unit 228 provides a booster 200 with a control signal S1 to permit the voltage boost (S208). Then, the voltage boosting condition determining unit 228 determines whether the value of the counter C of the engine start counter 224 has reached the marginal allowable number of times Ng (S210). In the case where the value has reached the marginal allowable number of times Ng, the voltage boosting condition determining unit 228 sets the coil cooling period Tc (S214). This coil cooling period Tc is determined by estimating a necessary time to cool the coil with reference to, for example, the initial engine start time. The voltage boosting condition determining unit 228 outputs, to the booster 200, a control signal S1 to inhibit the voltage boost during the coil cooling period Tc. On the other hand, in the case where the count value has not reached the marginal allowable number of times Ng, 1 is added to the count value of the counter C (S206) at a next engine start (S212). Then, the voltage boost is permitted (S208). This routine is repeated until the count value reaches the marginal allowable number of times Ng, except for the case where the engine is started successfully.

Figure 11:
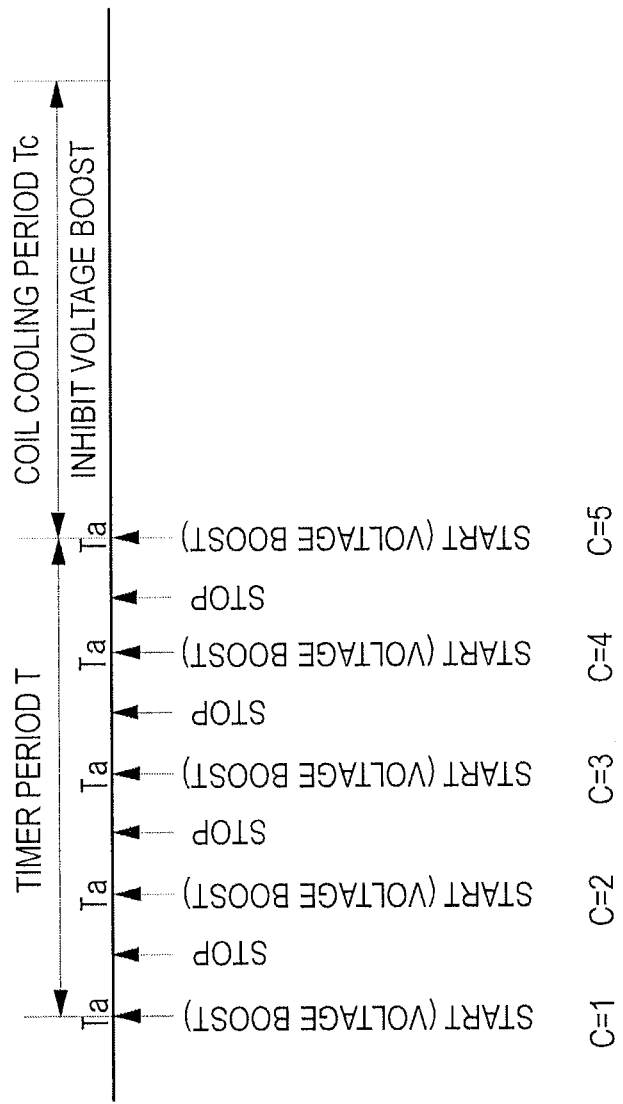
FIG. 11 is a diagram illustrating an exemplary operation according to the second embodiment.

FIG. 11 is a diagram schematically illustrating permission/inhibition of the voltage boost according to the second embodiment when the timer period T is set to 1 minute and the marginal allowable number of times Ng is set to 5. As illustrated in FIG. 11, the boosting circuit 204 is permitted to boost the voltage only at the time of starting the engine before the engine start count of the counter C reaches 5 (marginal allowable number of times Ng) within the timer period T. When the engine start count of the counter C reaches 5 times, i.e., the number of times the voltage is boosted reaches 5 times, the coil cooling period Tc is set. During this coil cooling period Tc, the boosting circuit is inhibited from boosting the voltage. After the coil cooling period Tc has passed, the engine start count is counted again within the timer period T, and in the case where the count value is smaller than the marginal allowable number of times Ng, the boosting circuit is permitted to boost the voltage.

Figure 12:
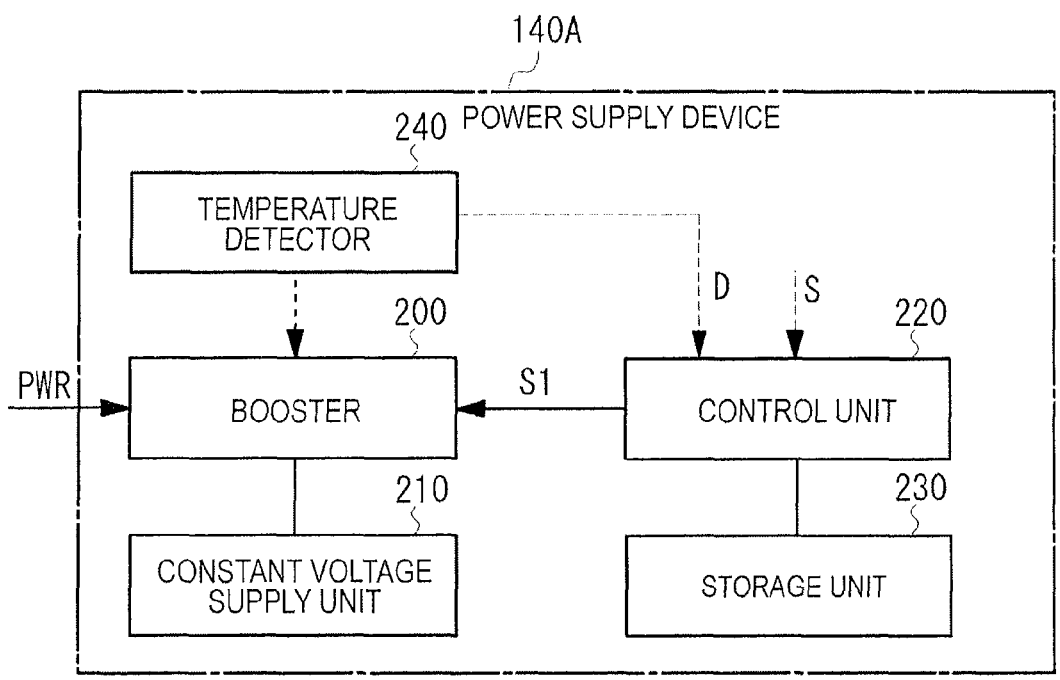
FIGS. 12A and 12B are diagrams illustrating another example of the power supply device according to an embodiment of the present invention.

Next, another modified example of the present embodiment will be described. According to the first and second embodiments, the examples have been given in which the timer period T, the allowable number of times N, and the marginal allowable number of times Ng are preset. However, the present embodiment is not limited thereto, and the timer period T, the allowable number of times N, and the marginal allowable number of times Ng may be dynamically changed. FIG. 12A is a diagram illustrating another exemplary structure of a power supply device. As illustrated in FIG. 12A, a power supply device 140A includes a temperature detector 240 to detect the temperature of a booster 200, particularly the temperature of a coil. The temperature detector 240 may include a known temperature sensor or a sensor that monitors current values or voltage values to be a function of temperature change. A detection result given by the temperature detector 240 is output to a control unit 220 as a detection signal D. Based on the detection signal D, the control unit 220 may change or vary the timer period T, the allowable number of times N, and the marginal allowable number of times Ng in real time. According to a preferred embodiment, a table specifying relations among the coil temperature, the timer period T, the allowable number of times N, and/or the marginal allowable number of times Ng is stored in a storage unit 230 as illustrated in FIG. 12B. The control unit 220 may select the timer period T, the allowable number of times N, and the marginal allowable number of times Ng in accordance with the coil temperature with reference to the table. This may reliably prevent the coil of the boosting circuit from being burnt, for example.

Figure 13:
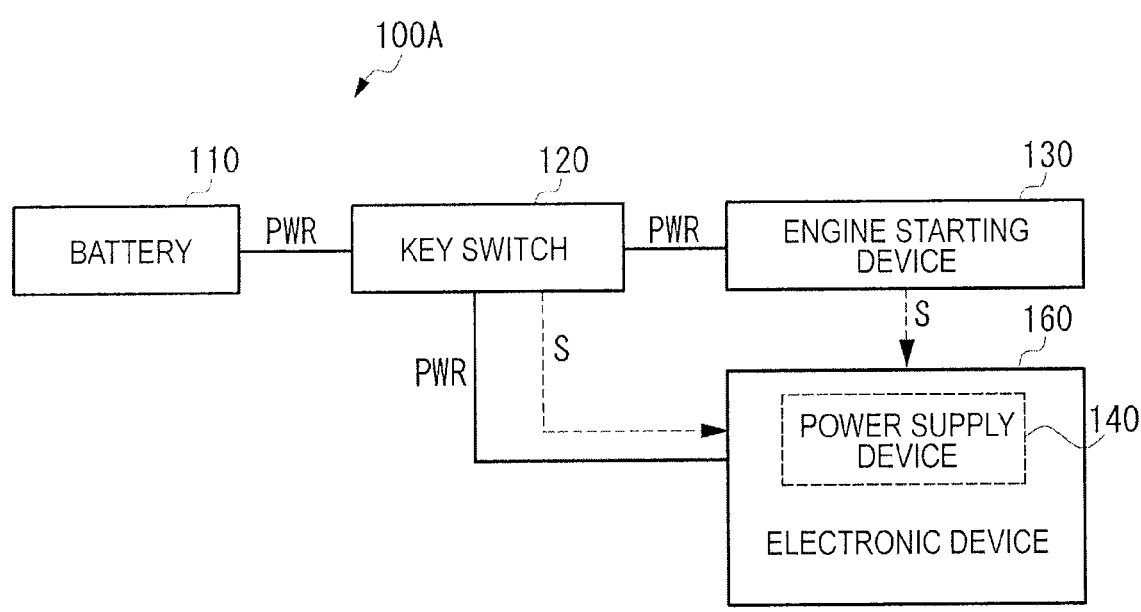
FIG. 13 is a diagram illustrating another exemplary configuration of the on-vehicle electronic system according to an embodiment of the present invention.

Further, in the on-vehicle electronic system 100 illustrated in FIG. 3, the power supply device 140 is shared by the plurality of electronic devices 150a to 150n, but the configuration of the power supply device 140 is not limited thereto. As illustrated in FIG. 13, one or a plurality of electronic devices 160 may each include its own power supply device 140. In this case, whether to permit or inhibit the voltage boost by the boosting circuit is determined and executed in each electronic device 160.

The cases in which the voltage is boosted by the boosting circuit in coordination with the engine start have been exemplified in the above-described embodiments. However, a condition that the voltage supplied from the battery is lower than a threshold may be added to the requirements for executing the voltage boost. In other words, the power supply device, in which the voltage is boosted by the boosting circuit, may be configured to determine whether the voltage boost is to be permitted or inhibited, and execute the voltage boost as described in the first and second embodiments when a start of the engine is detected and also the voltage from the battery is equal to or less than a threshold.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A power supply device to be mounted in a vehicle configured to start an engine with power supplied from a battery, comprising:
 a boosting circuit configured to boost voltage supplied from the battery;
 a detecting unit configured to detect a start of the engine;
 a counting unit configured to count an engine start count based on the detecting unit; and
 a control unit configured to control the boosting circuit,
 wherein the control unit permits the boosting circuit to boost the voltage in response to the engine start detected by the detecting unit when the engine start count counted by the counting unit for a predetermined period does not exceed a first allowable number of times.

2. The power supply device according to claim 1,
 wherein the control unit is configured to inhibit the boosting circuit from boosting the voltage for a predetermined time when the engine start count counted by the counting unit for the predetermined period exceeds a second allowable number of times that is larger than the first allowable number of times.

3. The power supply device according to claim 1, further comprising
 a time measuring unit configured to measure a time in response to a start of the engine,
 wherein the predetermined period is determined by the time measuring unit.

4. The power supply device according to claim 2, further comprising a temperature detecting unit configured to detect a temperature of the boosting circuit,
wherein the control unit determines at least one of the predetermined period, the first allowable number of times, and the second allowable number of times based on the detected temperature of the boosting circuit.

5. An on-vehicle electronic system comprising:
the power supply device according to claim 1; and
at least one electronic device configured to be actuated by power supplied from the power supply device.

6. The on-vehicle electronic system according to claim 5, wherein the power supply device is built inside the at least one electronic device.

7. A method for controlling a boosting circuit provided in a power supply device mounted in a vehicle configured to start an engine with power supplied from a battery, the method comprising:
detecting a start of the engine;
counting an engine start count that is detected; and
permitting the boosting circuit to boost voltage in response to detection of the engine start when the engine start count counted for a predetermined period does not exceed a first allowable number of times.

8. The method for controlling a boosting circuit according to claim 7, further comprising
inhibiting the boosting circuit from boosting the voltage for a predetermined time when the engine start count counted for the predetermined period exceeds a second allowable number of times that is larger than the first allowable number of times.

9. The method for controlling a boosting circuit according to claim 8, further comprising
detecting a temperature of the boosting circuit, and
determining at least one of the predetermined period, the first allowable number of times, and the second allowable number of times based on the detected temperature of the boosting circuit.

10. The method for controlling a boosting circuit according to claim 7, further comprising supplying the boosted voltage to at least one on-vehicle electronic device.

11. The method for controlling a boosting circuit according to claim 10, wherein each of a plurality of power supply devices supplies the boosted voltage to a different electronic device in the vehicle.

12. A non-transitory machine readable storage medium having stored thereon a program for controlling a boosting circuit provided in a power supply device mounted in a vehicle configured to start an engine with power supplied from a battery, the program comprising:
detecting a start of the engine;
counting an engine start count that is detected; and
permitting the boosting circuit to boost voltage in response to detection of the engine start when the engine start count counted for a predetermined period does not exceed a first allowable number of times.

13. The program for controlling a boosting circuit according to claim 12, further comprising
inhibiting the boosting circuit from boosting the voltage for a predetermined time when the engine start count counted for the predetermined period exceeds a second allowable number of times that is larger than the first allowable number of times.

14. The program for controlling a boosting circuit according to claim 13, further comprising
detecting a temperature of the boosting circuit, and
determining at least one of the predetermined period, the first allowable number of times, and the second allowable number of times based on the detected temperature of the boosting circuit.

15. The program for controlling a boosting circuit according to claim 12, further comprising supplying the boosted voltage to at least one on-vehicle electronic device.

16. The program for controlling a boosting circuit according to claim 15, wherein each of a plurality of power supply devices supplies the boosted voltage to a different electronic device in the vehicle.

* * * * *